(12) United States Patent
Morris et al.

(10) Patent No.: US 11,645,280 B2
(45) Date of Patent: May 9, 2023

(54) COST BASED FUNCTION OPTIMIZATION FOR COUPLED SYSTEMS

(71) Applicant: Teradata US, Inc., Dayton, OH (US)

(72) Inventors: John Mark Morris, Escondido, CA (US); Bhashyam Ramesh, Secunderabad (IN)

(73) Assignee: Teradata US, Inc., San Diego, CA (US)

( * ) Notice: Subject to any disclaimer, the term of this patent is extended or adjusted under 35 U.S.C. 154(b) by 1274 days.

(21) Appl. No.: 15/848,491

(22) Filed: Dec. 20, 2017

(65) Prior Publication Data

US 2019/0188298 A1 Jun. 20, 2019

(51) Int. Cl.
*G06F 16/27* (2019.01)
*G06F 16/2453* (2019.01)
*G06F 16/2455* (2019.01)

(52) U.S. Cl.
CPC .... *G06F 16/24542* (2019.01); *G06F 16/2455* (2019.01); *G06F 16/27* (2019.01)

(58) Field of Classification Search
CPC ............... G06F 16/24542; G06F 16/27; G06F 16/2455; G06F 16/245
USPC ........................................................ 707/718
See application file for complete search history.

(56) References Cited

U.S. PATENT DOCUMENTS

| | | | |
|---|---|---|---|
| 7,246,111 B1* | 7/2007 | Chaware | G06F 16/24 707/718 |
| 2007/0271275 A1 | 11/2007 | Fassette et al. | |
| 2015/0278320 A1 | 10/2015 | Bhatnagar et al. | |
| 2015/0339347 A1* | 11/2015 | Wiener | G06F 16/24542 707/718 |
| 2016/0171587 A1 | 6/2016 | El-Charif et al. | |
| 2017/0286145 A1 | 10/2017 | Anand et al. | |
| 2017/0351735 A1* | 12/2017 | Bruno | G06F 16/2453 |

* cited by examiner

*Primary Examiner* — Hosain T Alam
*Assistant Examiner* — Tracy M McGhee
(74) *Attorney, Agent, or Firm* — Howard Speight

(57) ABSTRACT

A function reference for a function is identified in a query. A plurality of processing environments that can provide the function is identified. Function costs for the function to process in the processing environments are obtained. Input data transfer costs are acquired for providing input data identified in the query to each of the functions. A specific one of the functions from a specific processing environment is selected based on the function costs and the input data transfer costs. A query execution plan for executing the query with the specific function is generated. The query execution plan is provided to a database engine for execution.

18 Claims, 4 Drawing Sheets

COST BASED FUNCTION OPTIMIZATION FOR COUPLED SYSTEMS

BACKGROUND

A distributed data warehouse includes voluminous amounts of data and resources. Some queries that are executed can take a significant amount of elapsed time to complete and tax a number of the resources. Consequently, conventional databases include an optimizer that produces query instructions for a query in an execution plan for purposes of executing the query in the most cost-effective and time-efficient manner given the resources of the database. Once the plan is selected, the query instructions are provided to one or more database engines for executing against the database in accordance with the selected plan.

Conventional warehouse have become increasingly more complex and often integrated with a number of independent and distinct systems/subsystems. A single resource of the warehouse may be accessible to the warehouse from native processing environments of the warehouse or from external processing environments associated with the systems or subsystems.

Moreover, each query may provide a different set of data that is needed by a particular resource identified in that query, such that a true execution cost associated with executing the resource with a particular set of data needs to account for each processing environment for which the resource can be processed and the cost of providing the set of data to those environments, as well as the cost in moving, if necessary, any result produced by the resource to the processing environment where the result is needed.

Unfortunately, conventional optimizers are not equipped with and do not account for the above-noted considerations when producing a query execution plan for a given query. That is, as the complexity of conventional data warehouses and the expansion of user-based features have grown, the conventional optimizers are increasingly producing less optimal query execution plans.

SUMMARY

Methods and a system for cost-based function optimization in coupled systems are presented.

In an embodiment, a method for cost-based function optimization is provided. Processing environments that provide a function are identified in response to a query having a reference to the function. Function costs for processing the function in each of the processing environments are acquired. Finally, an optimal processing environment for executing the function is selected based at least in part on the function costs.

DETAILED DESCRIPTION

Figure 1:
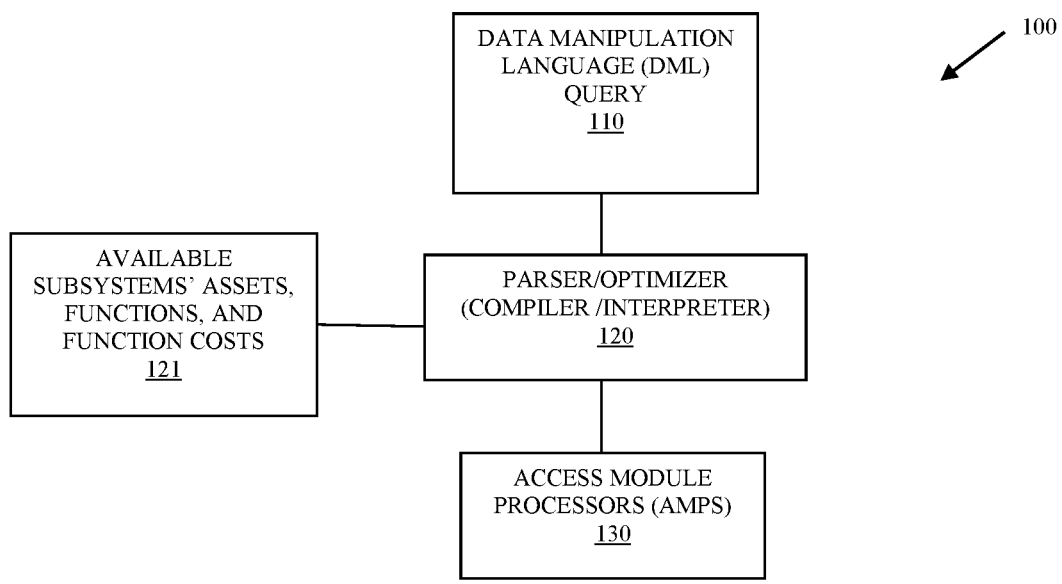
FIG. 1 is a diagram of a system for a distributed data warehouse providing cost-based function optimization in coupled systems, according to an embodiment.

Various embodiments depicted herein are implemented as one or more software modules, which are programmed within memory and/or non-transitory computer-readable storage media and executed on one or more processing devices (having memory, storage, network connections, one or more processors, etc.).

As used herein, the terms and phrases "database," and "data warehouse" may be used interchangeably and synonymously. That is, a data warehouse may be viewed as a collection of databases or a collection of data from diverse and different data sources that provides a centralized access and federated view of the data from the different data sources through the data warehouse (may be referred to as just "warehouse").

As used herein a "processing unit" is a distributed database engine that executes instructions on a network node device of the processing unit. Multiple distributed processing units are provided for executing database instructions in parallel over a network. The phrase "processing unit" may be used interchangeable and synonymously with the phrase "Access Module Processor (AMP)."

As used herein, a "resource" can be a hardware resource/asset (e.g., Central Processor Unit (CPU), Processing Element (PE), memory, storage, router, switch, etc.) or a software resource (software program, a data file, function, a data table, Virtual Machine (VM), container, etc.) or various combinations of hardware and/or software resources.

As used herein, a "system" refers to a cooperating set of software that provides one or more services within one or more processing environments. A "subsystem" is a distinct sub-processing environment providing one or more services of the system. A "processing environment" includes its own unique hardware and software resources. A same system may have multiple different processing environments. Moreover, different systems or subsystems may share a same processing environment. A processing environment may also be virtual such that the underlying hardware is logically accessed by the software of the processing environment (e.g., VM or container—note that in this way a VM or a container can be both a resource and a processing environment).

As used herein, the phrase "processing environment" may be used interchangeably and synonymously with the term "environment."

A "coupled system or coupled subsystem" is one in which multiple systems/subsystems are integrated/interfaced with one another and are at least partially dependent on one another, such that changes in one system/subsystem requires changes in the other system/subsystem for continued integrated support.

As used herein, a "function" is a hardware implemented operation or a software implemented operation that can be called from inside another software set of instructions to perform processing that returns a result. The function may/or may not include input data or parameters processed by the function.

With query grid architectures and multiple map architectures there is a need to extend query optimization to include data and functions on the tightly coupled maps subsystems and/or query grid adjunct systems. The enhanced processing of the provided novel optimizer evaluates the feasibility and cost of implementing a given function via emulation, native implementation, and/or hardware acceleration on a given set of systems or subsystems. The optimizer can also estimate the cost of moving data local to the function if it is not already present and the subsequent cost of locating or moving the resulting intermediate answer set to the next step or function in a query plan. This provided for improved query plan execution generation that appropriate accounts for all coupled systems of the data warehouse.

It is with this initial context that the FIGS. 1-4 are now discussed.

FIG. 1 is a diagram of a system 100 for a distributed data warehouse having cost-based function optimization for coupled systems of the distributed data warehouse, according to an embodiment.

The system 100 is shown in greatly simplified form with just those components necessary for comprehension of embodiments of the invention presented. It is to be understood that additional components or subcomponents may be used without departing from the teachings presented herein.

The system 100 includes a Data Manipulation Language (DML) (such as Structured Query Language (SQL)) query 110 (herein after just "query 110," a parser/optimizer (compiler/interpreter) 120 (herein after just "optimizer 102"), and Access Module Processors (AMPs) 130—that execute instructions against the database—the processing units or database engines). The system 100 also includes at least one dataset or service providing available subsystems' assets, functions, and function costs 121 (hereinafter just "subsystem and function information 121").

The query 110 can be issued and/or originate from an automated process (application or script) within the warehouse/database (such as through schedule reports, etc.) or can be issued and/or originate from an end-user (such as a Database Administrator (DBA) or Data Analyst) through a user-interface to the warehouse/database.

The optimizer 120 translates or interrupts the query 110 into a set of optimal instructions that the AMPs 130 process against the warehouse. Multiple query execution plans are typically produced by the optimizer 120 and the optimizer selects an optimal (least-cost) plan for execution.

The optimizer 120, then, provides the query instructions in accordance with the selected plan to the AMPs 130, each AMP 130 process instructions against tables that are assigned to that AMP 130.

The query plan generation techniques are enhanced within optimizer 120 to account for cost-based function optimization for coupled systems/subsystems of the warehouse.

The cost-based function optimization implemented with the optimizer 120 processed as follows. The optimizer 120 has access to the subsystem and function information 121, this includes various available loosely coupled query grid adjunct subsystems and their data assets and available function capabilities and function costs. The subsystem and function information 121 also includes various tightly coupled maps based subsystems and their data assets and available function capabilities and function costs.

For example, the subsystem and function information 121 may indicate that a given function is available to the warehouse and implemented on several systems or subsystems, each with different costs. For example, an emulated function in a non-native environment may be more costly in terms of CPU path length than executing the same function in its native environment (the function identified as being emulated in the non-native environment with a cost and as being native in its native environment with a cost). Furthermore, some functions may be implemented via hardware acceleration and benefit from lower cost of such an implementation. The subsystem and function information 121 may also indicate that certain data assets/resources are maintained consistently on more than one system or subsystems. The subsystem and function information 121 also includes the cost of moving data between each constituent system and subsystem.

The query plan search space of the optimizer 120 is updated to include actions for using the data needed by a function in a query 110 without any needed data transfer (the data is in the native processing environment of the given function) and actions for moving the data to a processing environment of a given function needed in the query 110.

The optimizer 120 is configured to access the subsystem and function information 121 when a given function is noted in a query 120 and expand the search space processing to include actions where the data needed by the function does not need to be transferred to the environment of the function and where the data needed by the function does need transferred to the environment of the function.

Furthermore, the optimizer is configured to account for costs associated with transferring or returning the answer set (result) of the function back to the initiating/requesting session from where the query 110 was initiated. That is, the cost of transferring results of the function back to the processing environment where the results are needed for a next step in processing the query 110.

A sample query 120 is now presented with processing of the enhanced optimizer 120 illustrated showing cost-based optimization for coupled systems. The processing proceeds as follows;

A query 110: "Select Function_A (Column X) from Table 1" is received for optimization by the optimizer 120.
The overall resources available include two map based subsystems and a query grid system.
  MAP1: Table 1 is available, Function A is emulated in software.
  MAP2: Table 1 is available in consistent form. Function A is implemented in hardware.
  Query Grid System 3: Table 1 is not available. Function A is native to the system.
The optimizer 120 generates several possible query execution plans:
  Plan 1: Emulate function A on Table 1 on MAP1.
  Plan 2: Execute function A in hardware on MAP2.
  Plan 3: Ship Table 1 to Query Grid System 3, and execute function A natively.

The optimizer 120 generates a cost estimate for each of these possible plans and choose a good low cost plan. The optimizer 120 also considers the cost of returning the answer set to the requesting session associated with the query 110.

It is to be noted that the query 110 can be far more complicated than the presented example query 110, including multiple tables, functions, and subsystems.

In an embodiment, the subsystem and function information 121 includes data for: identifying a function, identifying systems/subsystems where the function is available, identifying how the function is provided in each system/subsystem (hardware, software emulation, native), identifying hardware resources for each system/subsystem (including bandwidth capabilities), identifying processing environment configurations for each system/subsystem, identifying software resources (including data available) at each system/subsystem, and identifying an assigned cost for executing the function within each system/subsystem.

The optimizer 120 provides a mechanism for determining an optimal processing environment for executing a given function of a query 110 where the given function is available in multiple processing environments. Just the function may be executed in the processing environment of the selected function while other parts of the query 110 are executed in a different processing environment or the whole query 110 can be executed in the processing environment of the function. Costs associated with data shipping (transferring input data to the function's processing environment and transferring output data back to the processing environment of the initiating query session) and costs associated with executing the function from each of the available function processing environments are considered before selecting the optimal processing environment for executing the function.

In an embodiment, the enhanced processing for costing and selecting a processing environment to execute a given function within coupled systems is provided before existing query plan generation is performed by the optimizer 120 as a query plan pre-processing technique.

In an embodiment, the enhanced processing described can be triggered for processing within the optimizer 120 for a portion of a given query 120 or for the whole query 120.

In an embodiment, the optimizer 120 also considers plan options that ship or port a given function to a different processing environment for executing with the query 110 (referred to as function shipping). This is particularly useful when the different processing environment lacks the given function but has a superior CPU and/or other hardware resources that are available.

These and other embodiments are now discussed with reference to the FIGS. 2-4.

Figure 2:
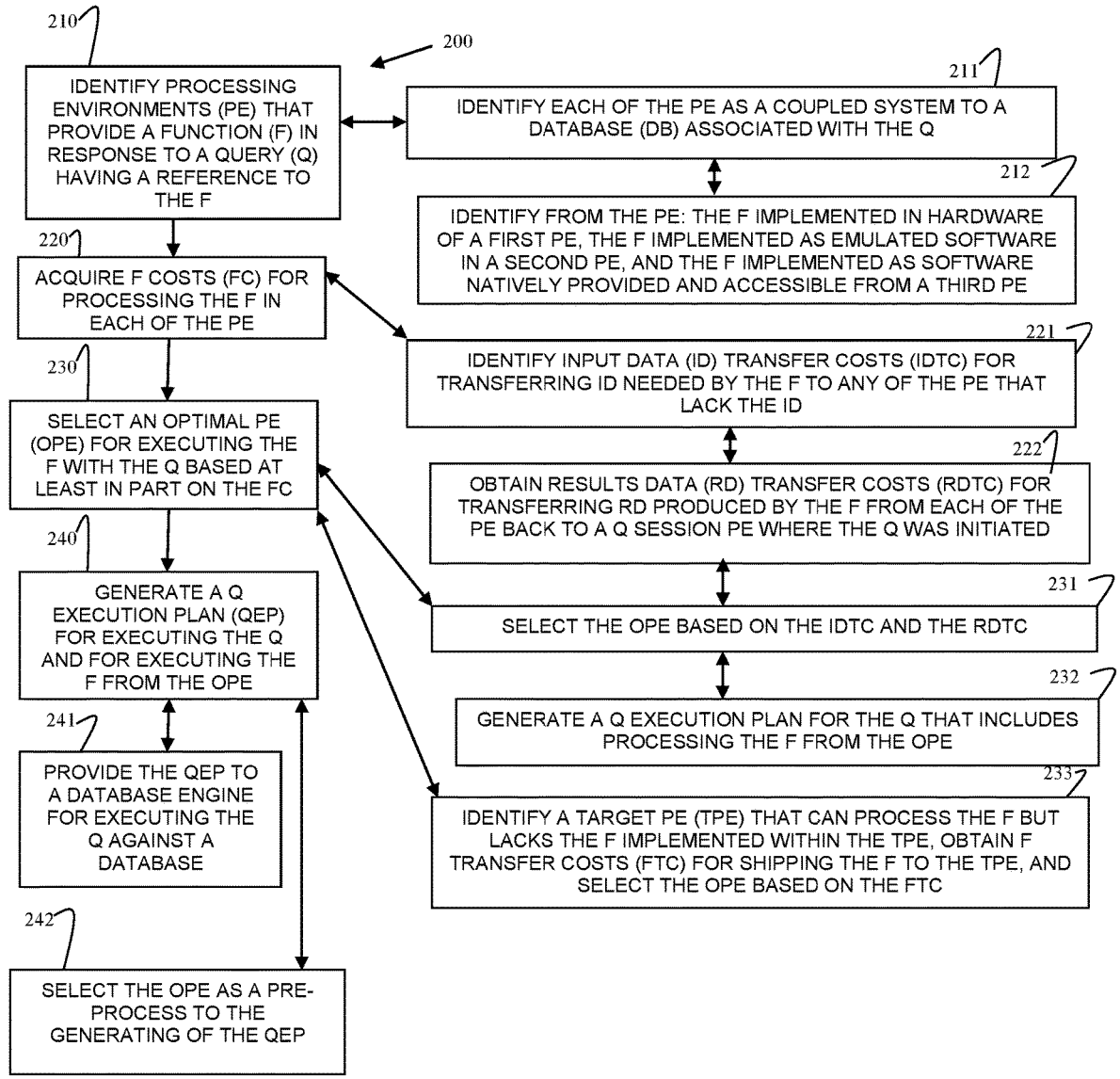
FIG. 2 is a diagram of a method for cost-based function optimization within a coupled system, according to an example embodiment.

FIG. 2 is a diagram of a method 200 for cost-based function optimization within a coupled system, according to an example embodiment. The method 200 is implemented as one or more software modules referred to as a "function cost optimizer"). The function cost optimizer is executable instructions that are programmed within memory or a non-transitory computer-readable medium and executed by one or more hardware processors. The query plan searcher has access to one or more network connections during processing, which can be wired, wireless, or a combination of wired and wireless.

In an embodiment, the function cost optimizer is implemented within a data warehouse across one or more physical devices or nodes (computing devices) for execution over a network connection.

In an embodiment, the function cost optimizer is the optimizer 120 with the enhanced processing discussed above with the FIG. 1.

At 210, the function cost optimizer identifies processing environments that provide a function in response to a presented query for processing by the function cost optimizer that references the function within the query conditions.

In an embodiment, at 211, the function cost optimizer identifies each of the processing environments as a coupled system/subsystem to a database associated with the query. In an embodiment, at least one coupled system is a maps-based system and at least one coupled system is a query-grid based system.

In an embodiment of 211 and at 212, the function cost optimizer identifies from the processing environments: the function implemented in hardware within a first processing environment, the function implemented as emulated software within a second processing environment, and the function implemented as software natively provided and accessible from a third processing environment.

At 220, the function cost optimizer acquires function costs for processing the function in each of the processing environments.

In an embodiment, at 221, the function cost optimizer identifies input data transfer costs for transferring input data needed by the function to any of the processing environments that lack the input data natively.

In an embodiment of 221 and at 222, the function cost optimizer obtains results data transfer costs for transferring results data produced by the function from each of the processing environments back to a query session processing environment where the query was originally initiated.

At 230, the function cost optimizer selects an optimal processing environment from the plurality of processing environments for executing the function with the query based at least in part on the function costs.

In an embodiment of 222 and 230, at 231, the function cost optimizer selects the optimal processing environment based on the input data transfer costs and the results data transfer costs (these are data shipping costs).

In an embodiment of 231 and at 232, the function cost optimizer generates a query execution plan for the query that includes processing the function from the optimal processing environment.

In an embodiment, at 233, the function cost optimizer identifies a target processing environment that can process the function but that lacks the function implemented within that target processing environment. The function cost optimizer obtains function transfer costs for shipping (function shipping) the function to the target processing environment, and the function cost optimizer selects the optimal processing environment based on the function transfer costs.

According to an embodiment, at 240, the function cost optimizer generates a query execution plan for executing the query and for executing the function from the optimal processing environment.

In an embodiment, at 241, the function cost optimizer provides the query execution plan to a database engine (AMP 130) for executing the query against a database.

In an embodiment, at 242, the function cost optimizer selects the optimal processing environment as a pre-process to generating the query execution plan for the query.

Figure 3:
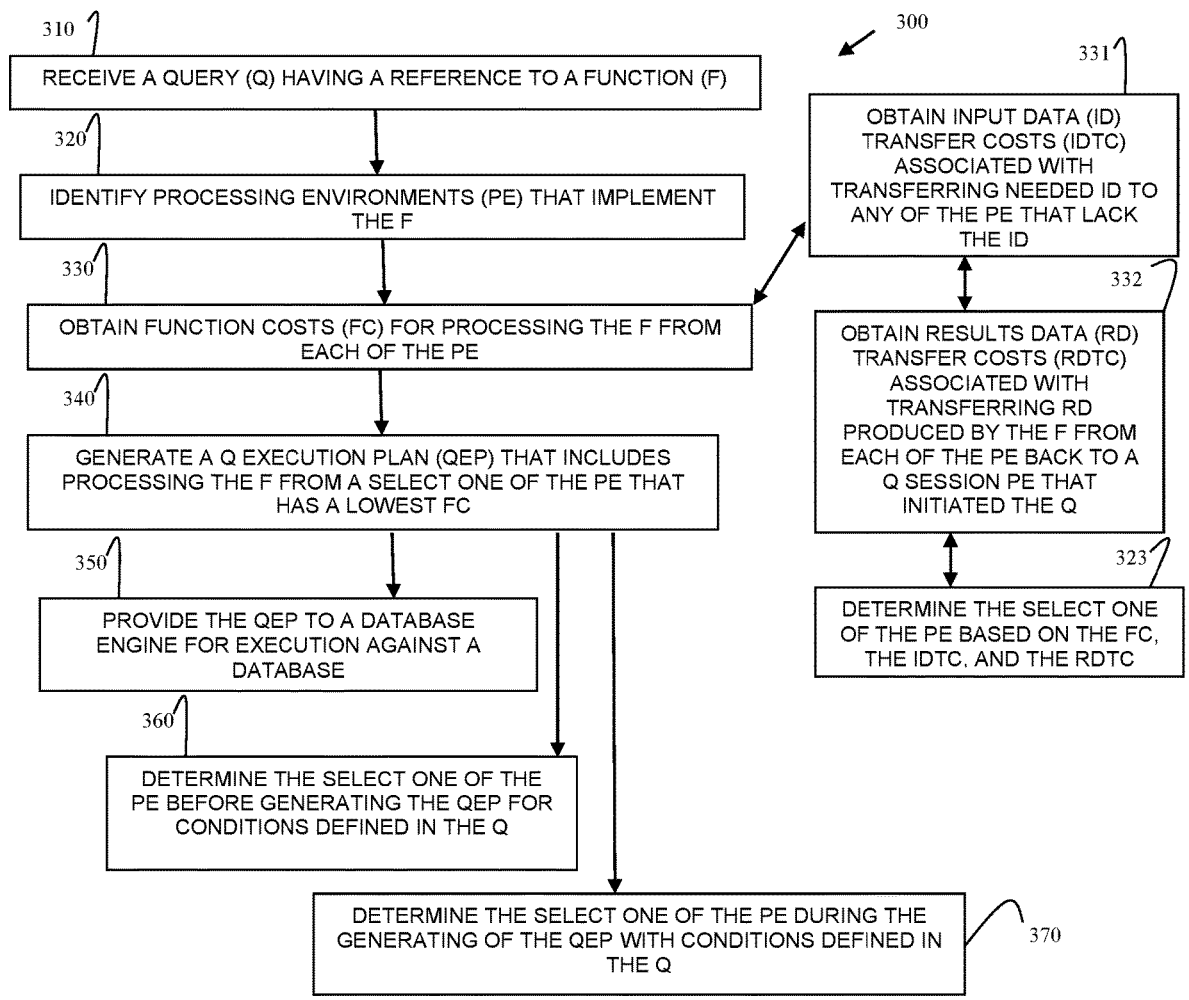
FIG. 3 is a diagram of another method for cost-based function optimization within a coupled system, according to an example embodiment.

FIG. 3 is a diagram of another method 300 for cost-based function optimization within a coupled system, according to an example embodiment. The method 300 is implemented as one or more software modules referred to as a "coupled systems optimizer." The coupled systems optimizer is executable instructions that are programmed within memory or a non-transitory computer-readable medium and executed by one or more hardware processors. The coupled systems optimizer has access to one or more network connections during processing, which can be wired, wireless, or a combination of wired and wireless.

The coupled systems optimizer presents another and in some ways enhanced perspective of the processing discussed above with the FIG. 1.

In an embodiment, the coupled systems optimizer is all or some combination of: the optimizer 120 and/or the method 200.

At 310, the coupled systems optimizer receives a query having a reference to a function.

At 320, the coupled systems optimizer identifies all the processing environments that implement and provide the function for execution.

At 330, the coupled systems optimizer obtains function costs for processing the function from each of the processing environments.

In an embodiment, at 331, the coupled systems optimizer obtains input data transfer costs associated with transferring needed input data to any of the processing environments that lack the input data native to their processing environments.

In an embodiment of 331 and at 332, the coupled systems optimizer obtains results data transfer costs associated with transferring results data produced by the function from each of the processing environments back to a query session processing environment that initiated the query.

In an embodiment of 332 and at 333, the coupled systems optimizer determines the select one of the processing environments based on the function costs, the input data transfer costs, and the results data transfer costs.

At 340, the coupled systems optimizer generates a query execution plan that includes processing the function from a select one of the processing environments that has a lowest function costs from the available function costs assigned to each of the processing environments.

According to an embodiment, at 350, the coupled systems optimizer provides the query execution plan to a database engine (AMP 130) for execution against a database.

In an embodiment, at 360, the coupled systems optimizer determines the select one of the processing environments before generating the query execution plan for conditions defined in the query.

In an embodiment, at 370, the coupled systems optimizer determines the select one of the processing environments during the generating of the query execution plan with conditions defined in the query.

Figure 4:
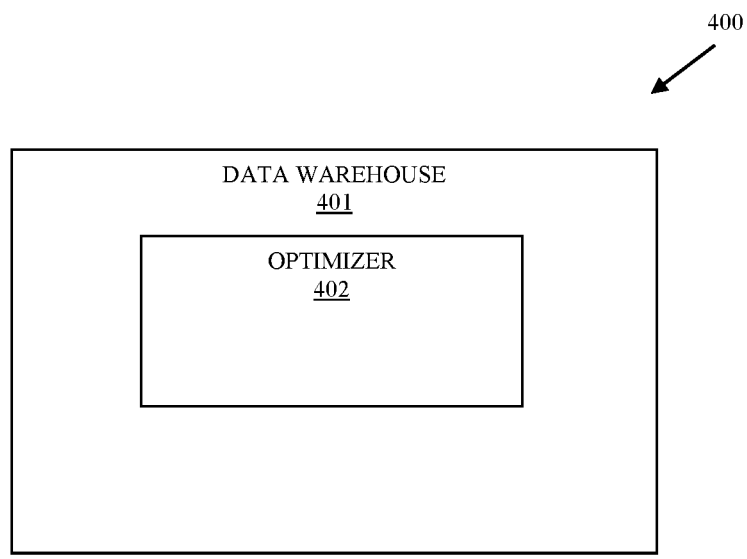
FIG. 4 is a diagram of a system for cost-based function optimization within a coupled system, according to an example embodiment.

FIG. 4 is a diagram of another system 400 for cost-based function optimization within coupled systems of a distributed data warehouse, according to an embodiment. The system 400 includes a variety of hardware components and software components. The software components are programmed as executable instructions into memory or a non-transitory computer-readable medium for execution on the hardware components.

The system 400 implements, inter alia, the processing discussed above with the FIGS. 1-3.

The system 400 includes a data warehouse 401. The data warehouse 401 includes an optimizer 402.

The optimizer 402 is configured to: 1) execute on at least one hardware processor of a network computing device, 2) identify processing environments providing a function that is referenced in a query, 3) obtain function costs for processing the function in each of the processing environments, and 4) generate a query execution plan for executing the query against the data warehouse 401 that includes executing the function from a lowest cost processing environment based on the function costs.

In an embodiment, the optimizer 402 is further configured, in 4), to: determine the lowest cost processing environment based on input data transfer costs associated with transferring input data to any of the processing environments that lack the input data and based on results data transfer costs associated with transferring results data produced by the function from the processing environments back to a query session processing environment that initiated the query.

In an embodiment, the optimizer 402 is implemented within the optimizer 120.

In an embodiment, the optimizer 402 is the method 200.

In an embodiment, the optimizer 402 is the method 300.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled

The invention claimed is:

1. A method, comprising:
a database including an optimizer that includes a function cost optimizer, the function cost optimizer identifying a plurality of processing environments that provide a function in response to a query having a reference to the function wherein each of the plurality of processing environments comprises hardware and software resources unique from hardware and software resources of all others of the plurality of processing environments and wherein identifying further includes obtaining results data transfer costs for transferring results data produced by the function from each of the processing environments back to the database;
the function cost optimizer acquiring respective function costs for processing the function in each of the plurality of processing environments;
the function cost optimizer selecting an optimal processing environment from among the plurality of processing environments for executing the function with the query based at least in part on the function costs and the results data transfer costs; and
the database executing the query including executing the function on the selected optimal processing environment.

2. The method of claim 1, wherein identifying further includes identifying each of the plurality of processing environments as a coupled system to the database associated with the query, such that a change in the database requires a change in the plurality of processing environments.

3. The method of claim 2, wherein identifying further includes identifying from the plurality of processing environments: the function implemented in hardware within a first processing environment of the plurality of processing environments, the function implemented as emulated software within a second processing environment of the plurality of processing environments, and the function implemented as software that is natively provided and accessible from a third processing environment of the plurality of processing environments, wherein the first processing environment, the second processing environment, and the third processing environments are all different processing environments.

4. The method of claim 1, wherein acquiring further includes identifying input data transfer costs for transferring input data needed by the function to any of the processing environments that lack the input data.

5. The method of claim 1, wherein selecting further includes selecting the optimal processing environment based on the input data transfer costs and the results data transfer costs.

6. The method of claim 5, wherein selecting further includes generating a query execution plan for the query that includes processing the function from the optimal processing environment.

7. The method of claim 1, wherein selecting further includes identifying at least one target processing environment from among the plurality of processing environments that can process the function but lacks the function implemented within that at least one target processing environment, obtaining function transfer costs for shipping the function to the at least one target processing environment, and selecting the optimal processing environment based on the function transfer costs.

8. The method of claim 1 further comprising the function cost optimizer generating a query execution plan for executing the query and for executing the function from the optimal processing environment.

9. The method of claim 8 further comprising the function cost optimizer providing the query execution plan to a database engine for executing the query against the database.

10. The method of claim 8, wherein generating further includes selecting the optimal processing environment as a pre-process to the generating of the query execution plan.

11. A method, comprising:
   a database receiving a query having a reference to a function;
   a function cost optimizer included in an optimizer included in the database identifying a plurality of processing environments that implement the function wherein each of the plurality of processing environments comprises hardware and software resources unique from hardware and software resources of all others of the plurality of processing environments;
   the function cost optimizer obtaining respective function costs for processing the function from each of the processing environments wherein obtaining further includes obtaining results data transfer costs associated with transferring results data produced by the function from each of the processing environments to the database;
   the function cost optimizer generating a query execution plan for the query that includes processing the function from a select one of the processing environments that has a lowest function cost; and
   the database executing the query including executing the function on the selected optimal processing environment;
   obtaining input data transfer costs associated with transferring needed input data to any of the processing environments that lack input data.

12. The method of claim 11, wherein obtaining further includes obtaining input data transfer costs associated with transferring needed input data to any of the processing environments that lack input data.

13. The method of claim 11, wherein generating further includes determining the select one of the processing environments based on the function costs, the input data transfer costs, and the results data transfer costs.

14. The method of claim 11 further comprising, providing the query execution plan to a database engine for execution against the database.

15. The method of claim 11 further comprising, determining the select one of the processing environments before generating the query execution plan for conditions defined in the query.

16. The method of claim 11 further comprising, determining the select one of the processing environments during the generating of the query execution plan with conditions defined in the query.

17. A system, comprising:
   a data warehouse including:
      an optimizer including a function cost optimizer;
      wherein the function cost optimizer is configured to: i) execute on at least one network node of the data warehouse, ii) identify a plurality of processing environments providing a function that is referenced in a query wherein each of the plurality of processing environments comprises hardware and software resources unique from hardware and software resources of all others of the plurality of processing environments wherein identifying further includes obtaining results data transfer costs for transferring results data produced by the function from each of the processing environments back to the database, iii) obtain respective function costs for processing the function in each of the processing environments, iv) generate a query execution plan for executing the query against the data warehouse that includes executing the function from a lowest cost processing environment based on the function costs and the results data transfer costs; and
   a processing unit to execute the query execution plan.

18. The system of claim 17, wherein the function cost optimizer is further configured in, iv), to: determine the lowest cost processing environment based on input data transfer costs associated with transferring input data to any of the processing environments that lack the input data and based on the results data transfer costs.

* * * * *